United States Patent
Ahn

(10) Patent No.: US 10,738,934 B2
(45) Date of Patent: Aug. 11, 2020

(54) GAP ADJUSTING DEVICE OF MULTI-DISPLAY AND MULTI-DISPLAY HAVING THE SAME

(71) Applicant: LG DISPLAY CO., LTD., Seoul (KR)

(72) Inventor: MinSik Ahn, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/587,664

(22) Filed: Sep. 30, 2019

(65) Prior Publication Data

US 2020/0103068 A1   Apr. 2, 2020

(30) Foreign Application Priority Data

Sep. 28, 2018  (KR) .................. 10-2018-0116183

(51) Int. Cl.
  *F16M 11/04*   (2006.01)
  *F16M 13/02*   (2006.01)
(52) U.S. Cl.
  CPC .......... *F16M 11/043* (2013.01); *F16M 13/02* (2013.01)
(58) Field of Classification Search
  USPC .................. 381/87, 324, 336, 361, 386, 387
  See application file for complete search history.

(56) References Cited

U.S. PATENT DOCUMENTS

2009/0278006 A1* 11/2009 Park .................. F16M 11/10
  248/205.1
2009/0278008 A1* 11/2009 Park .................. A47G 1/18
  248/231.91

\* cited by examiner

*Primary Examiner* — Yosef K Laekemariam
(74) *Attorney, Agent, or Firm* — Birch, Stewart, Kolasch & Birch, LLP

(57) ABSTRACT

A gap adjusting device for adjusting a gap of displays adjacent to each other of a multi-display can include a body, a first fixing part, a second fixing part, an adjusting part, a first wire and a second wire. A fastening hole is defined in the body. The first fixing part is received inside the body, and the first fixing part is fixed to a first display. The second fixing part is received inside the body, and the second fixing part is fixed to a second display adjacent to the first display. The adjusting part is configured to be received in the fastening hole to be rotated, and the adjusting part is interposed between the first fixing part and the second fixing part. The first wire is connected to the adjusting part and the first fixing part, and the second wire is connected to the adjusting part and the second fixing part.

17 Claims, 8 Drawing Sheets

[FIG. 1]
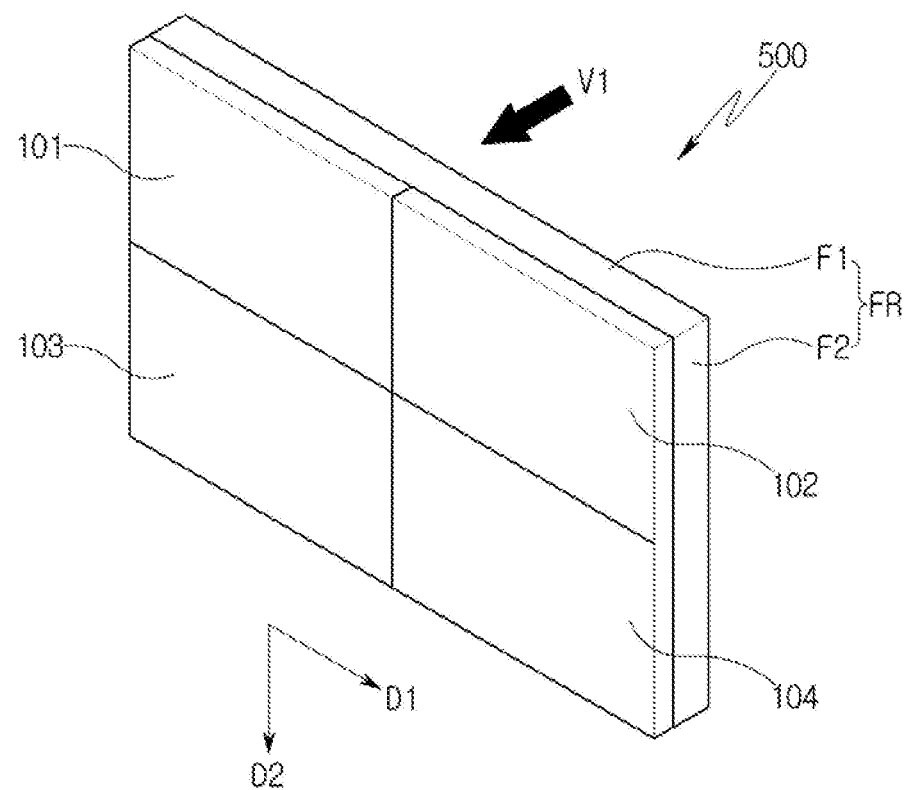

[FIG. 2]
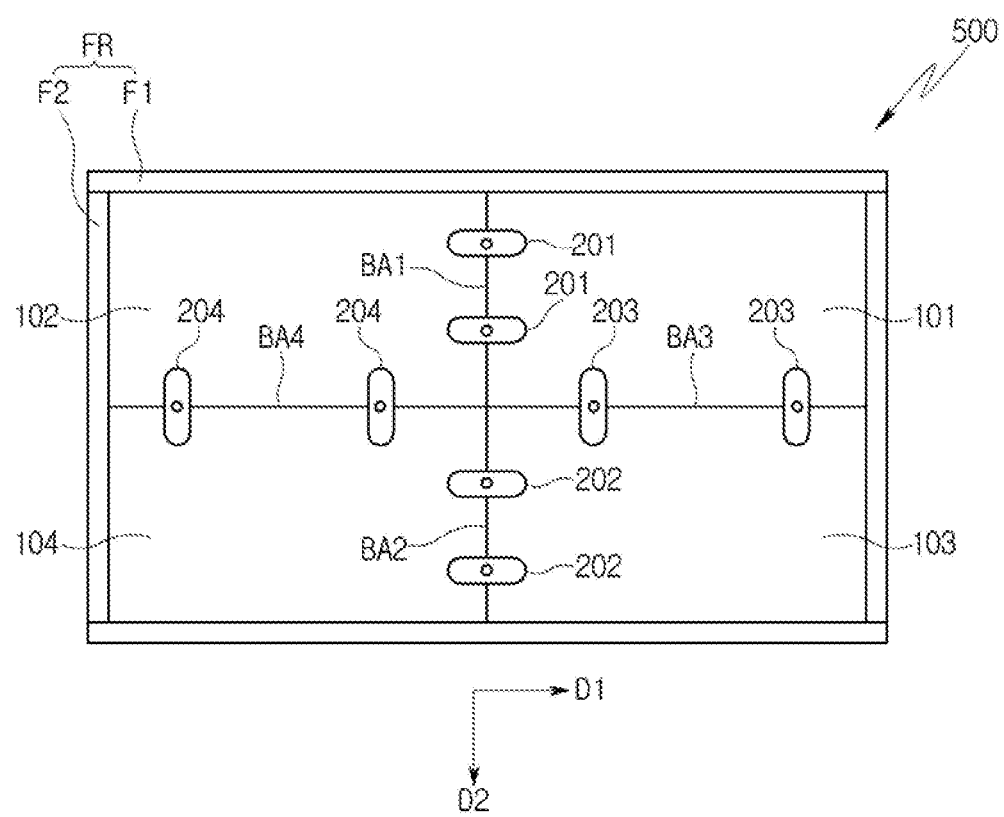

[FIG. 3]
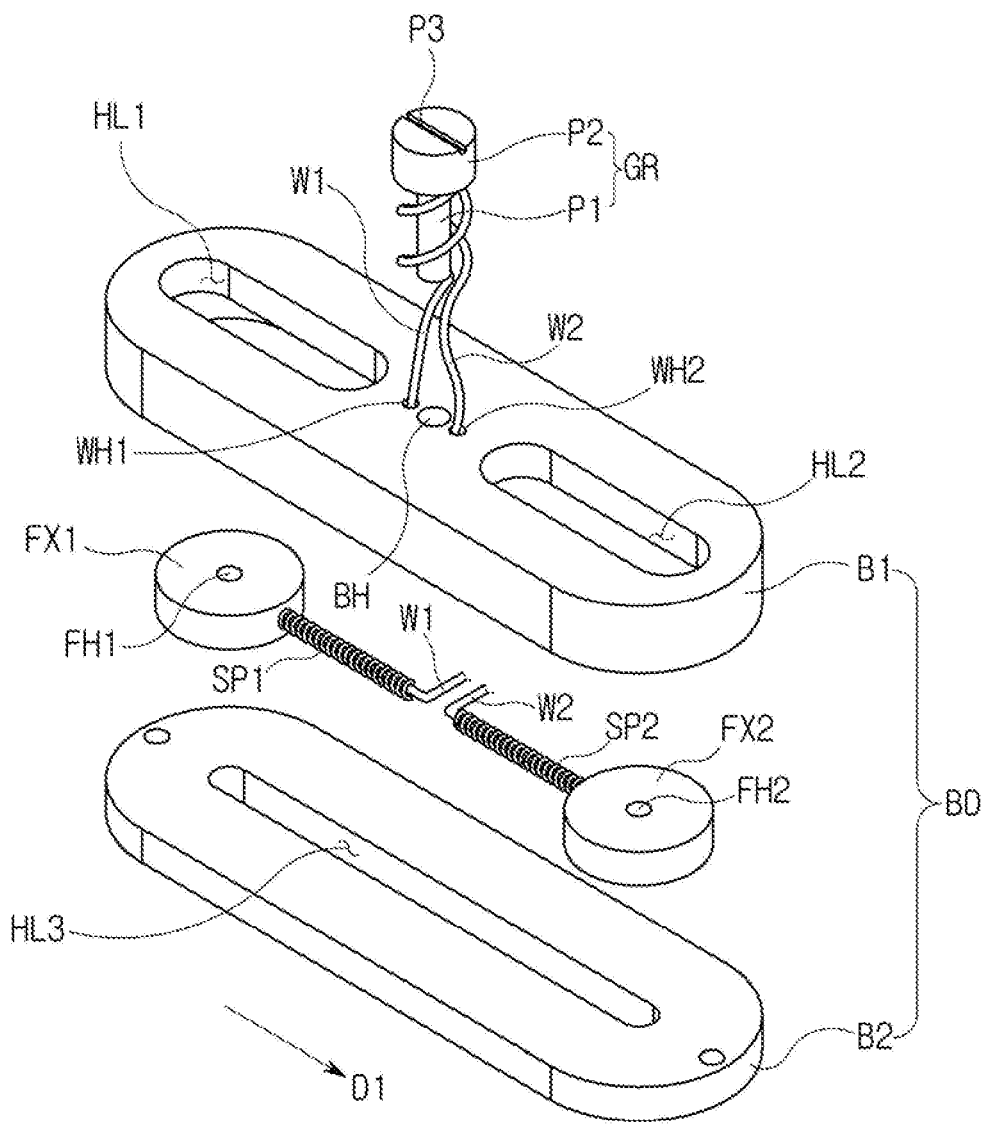

[FIG. 4]
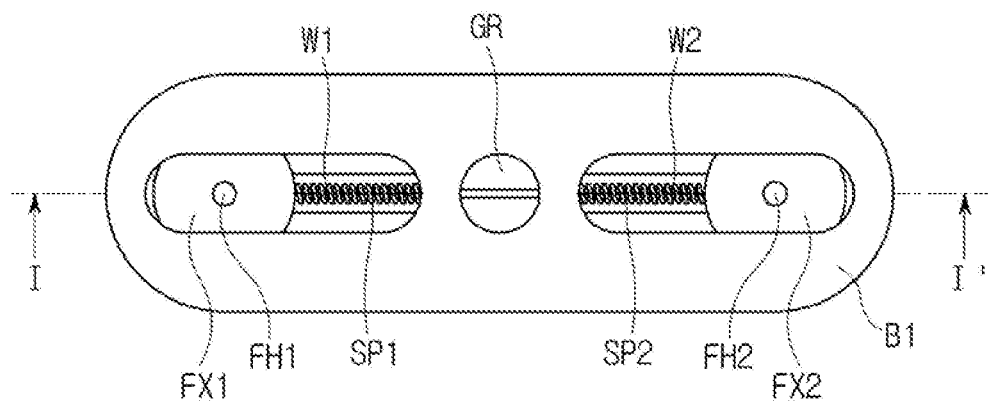
[FIG. 5]
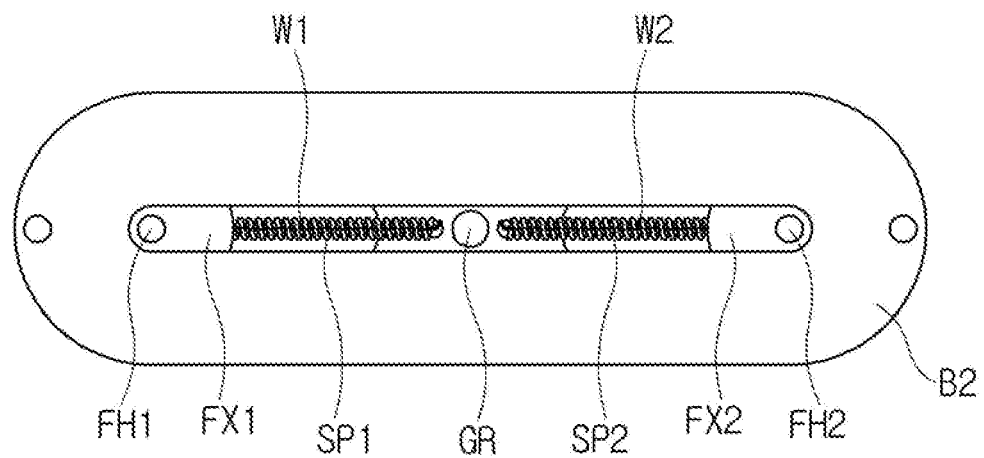

[FIG. 6]
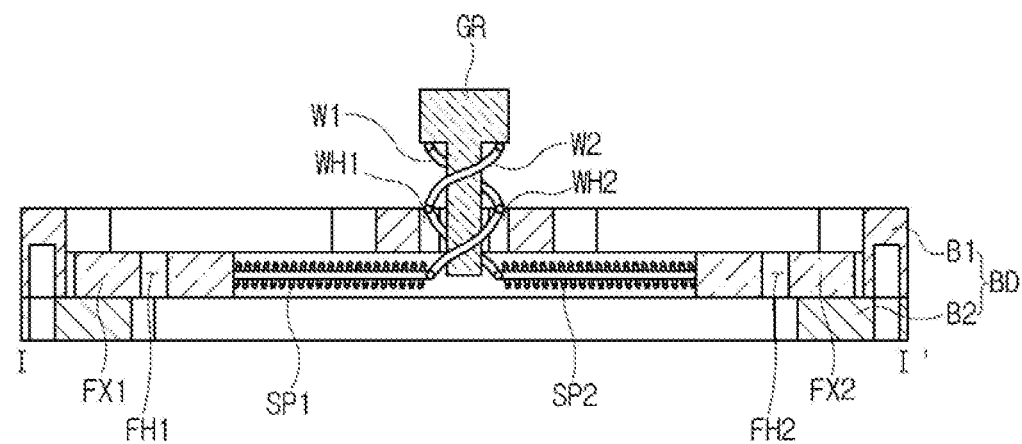
[FIG. 7]
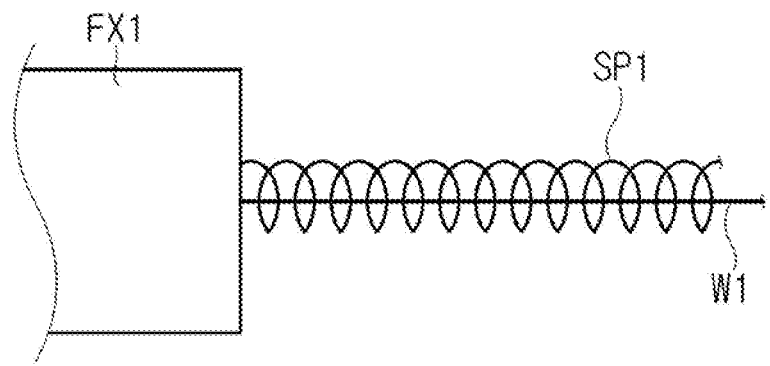

[FIG. 8A]
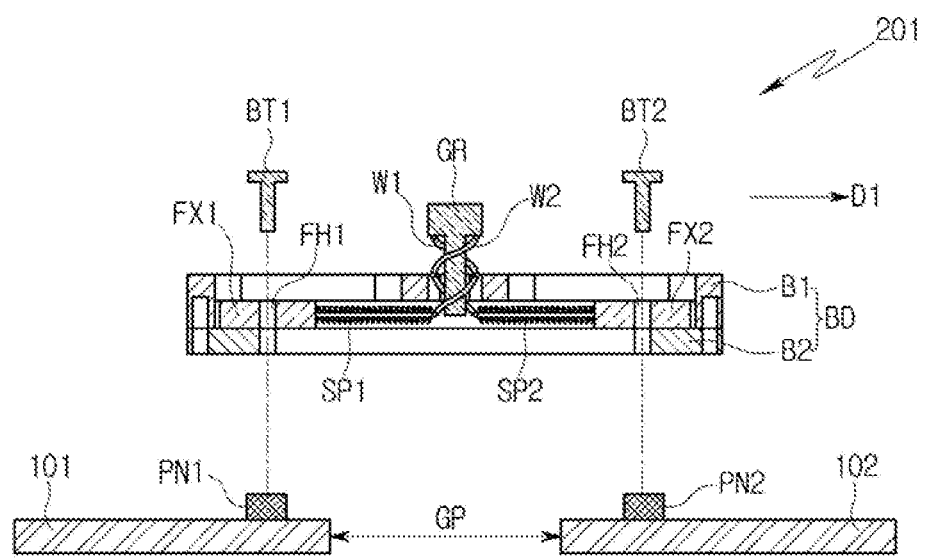
[FIG. 8B]
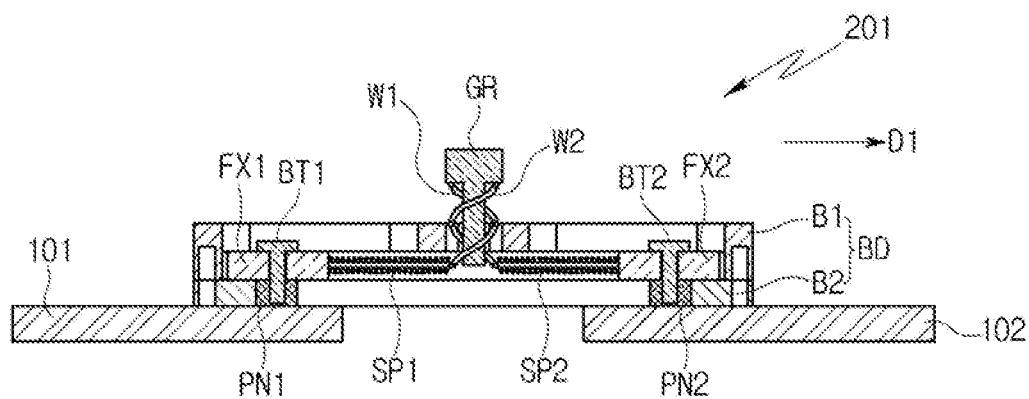

[FIG. 8C]
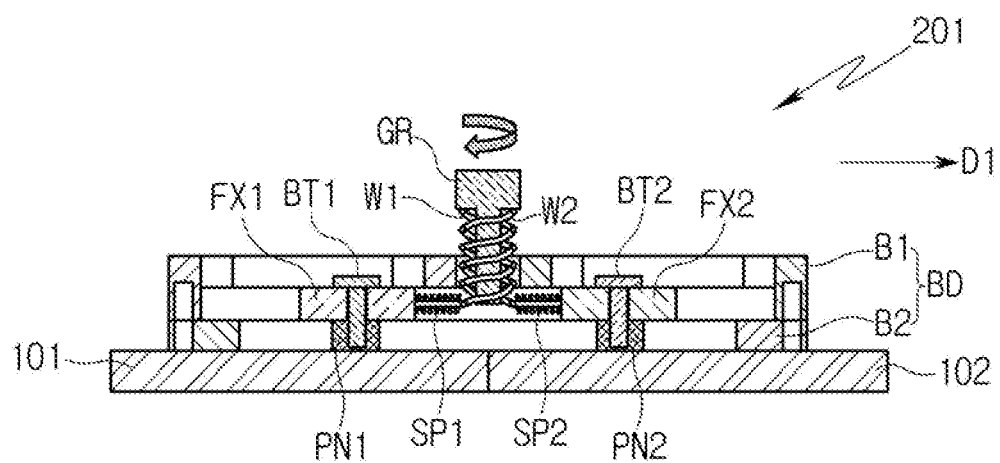
[FIG. 9A]
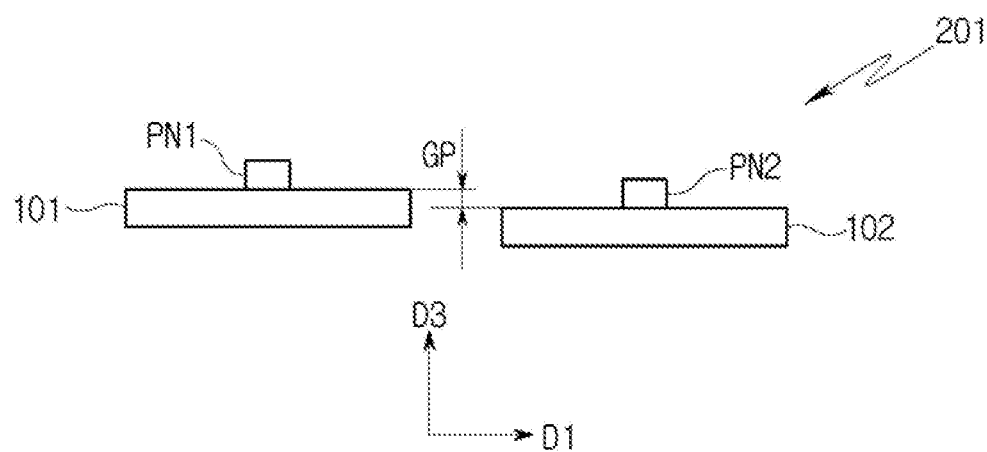

[FIG. 9B]
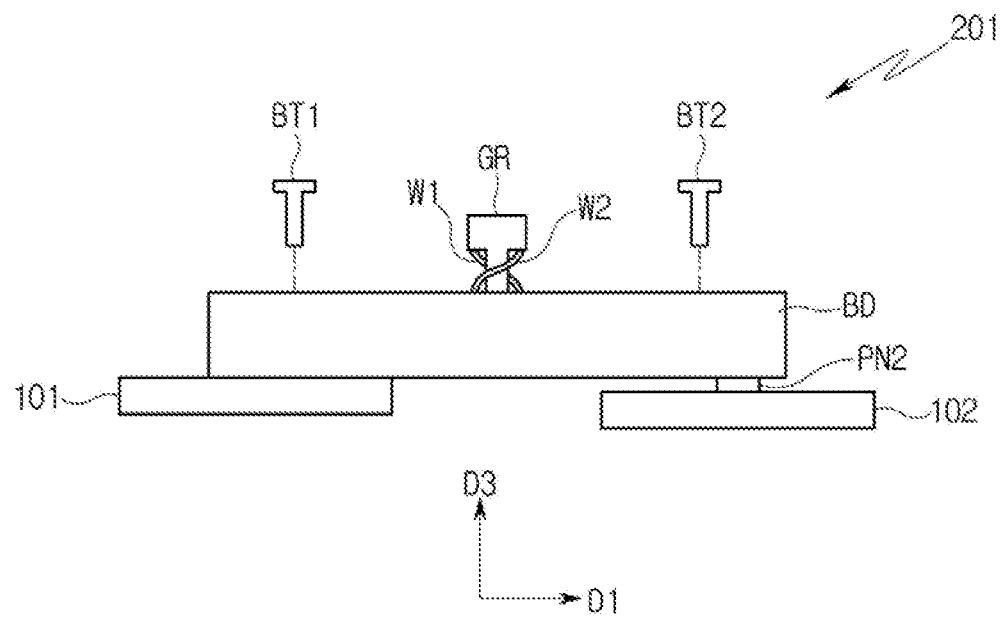
[FIG. 9C]
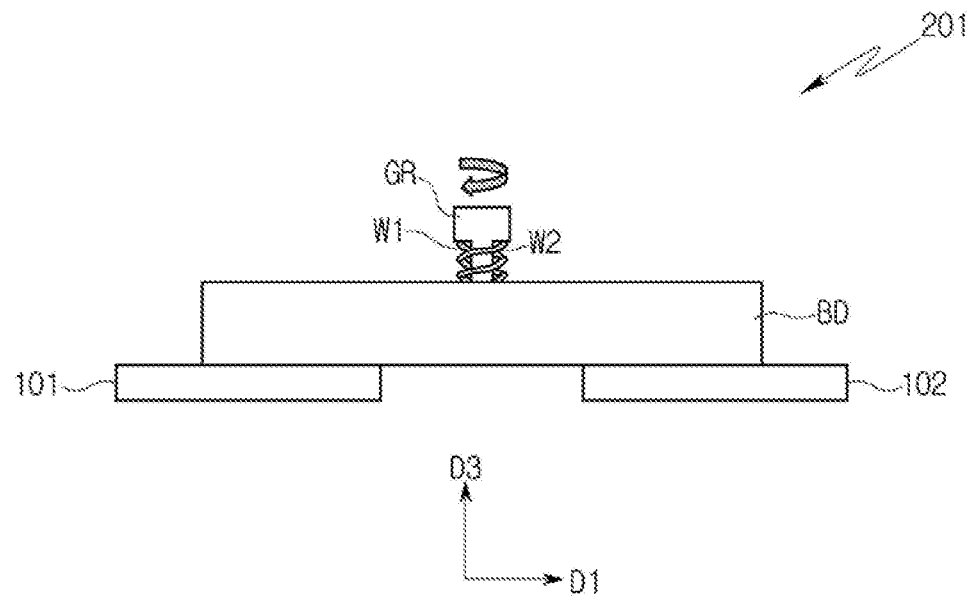

GAP ADJUSTING DEVICE OF MULTI-DISPLAY AND MULTI-DISPLAY HAVING THE SAME

CROSS-REFERENCE(S) TO RELATED APPLICATIONS

This application claims priority to Korean Patent Application No. 10-2018-0116183, filed on Sep. 28, 2018 in the Republic of Korea, the disclosure of which is incorporated herein by reference in its entirety into the present application.

BACKGROUND OF THE DISCLOSURE

Field of the Disclosure

The present disclosure relates to a gap adjusting device of a multi-display and a multi-display having the same, and more particularly, to a gap adjusting device and a multi-display having the same, which are coupled to the displays adjacent to each other of a multi-display and for easily adjusting the gap between the displays.

Description of the Related Art

When a display device is installed in a place where many people are crowded or in a public facility used by many people, a large-sized display device is required due to the characteristics of the installed place. Although a multi-display is composed of a plurality of displays, the multi-display is driven as if an image is driven on one screen, such that the multi-display can effectively provide image information to many people in a public place.

Meanwhile, since the large-sized display, for example, the large-sized display of 100 inches or more is installed for special purposes and its demand is not constant, the mass production of the large-sized display may not be desirable. Therefore, rather than implementing the large-sized display with a single display, the multi-display composed of a plurality of displays coupled in the form of a single display device can be more practical and cost efficient.

SUMMARY OF THE DISCLOSURE

An object of the present disclosure is to provide a gap adjusting device, which can easily adjust the gap between a plurality of displays adjacent to each other of a multi-display.

Another object of the present disclosure is to provide a multi-display, which includes a gap adjusting device for adjusting a gap between a plurality of displays adjacent to each other, and is easy to install.

In a gap adjusting device for adjusting the gap of displays adjacent to each other of a multi-display, the gap adjusting device of the multi-display for achieving the above-described object of the present disclosure includes a body, a first fixing part, a second fixing part, an adjusting part, a first wire and a second wire.

According to an example of the present disclosure, a fastening hole is defined in the body. The first fixing part is received inside the body, and the first fixing part is fixed to a first display. The second fixing part is received inside the body, and the second fixing part is fixed to a second display adjacent to the first display. The adjusting part is configured to be received in the fastening hole to be rotated, and the adjusting part is interposed between the first fixing part and the second fixing part. A first wire is connected to the adjusting part and the first fixing part, and the second wire is connected to the adjusting part and the second fixing part.

According to an example of the present disclosure, a multi-display for achieving the above-described another object of the present disclosure includes a first display, a second display positioned adjacent to the first display, and a gap adjusting device coupled with the first display and the second display and for adjusting the gap between the first display and the second display.

The gap adjusting device can include a body, a first fixing part, a second fixing part, an adjusting part, a first wire, and a second wire. A fastening hole is defined in the body. The first fixing part is received inside the body, and the first fixing part is fixed to a first display. The second fixing part is received inside the body, and the second fixing part is fixed to a second display. The adjusting part is configured to be received in the fastening hole to be rotated, and the adjusting part is interposed between the first fixing part and the second fixing part. The first wire is connected to the adjusting part and the first fixing part, and the second wire is connected to the adjusting part and the second fixing part.

BRIEF DESCRIPTION OF THE DRAWINGS

FIG. 1 is a perspective diagram of a multi-display device according to an embodiment of the present disclosure.

FIG. 2 is a diagram illustrating the rear surface of the multi-display device illustrated in FIG. 1.

FIG. 3 is an exploded perspective diagram of a gap adjusting device illustrated in FIG. 2.

FIG. 4 is a plane diagram of the gap adjusting device illustrated in FIG. 3.

FIG. 5 is a rear diagram of the gap adjusting device illustrated in FIG. 3.

FIG. 6 is a cross-sectional diagram illustrating the surface taken along the line I-I' illustrated in FIG. 4.

FIG. 7 is an enlarged diagram of a first spring, a first wire, and a first fixing part illustrated in FIG. 3.

FIGS. 8A to 8C are diagrams illustrating a method for reducing a gap in a horizontal direction between the displays constituting the multi-display by using the gap adjusting device illustrated in FIG. 3.

FIGS. 9A to 9C are diagrams illustrating a method for adjusting a gap in a vertical direction between the displays constituting the multi-display by using the gap adjusting device illustrated in FIG. 3.

DESCRIPTION OF THE EMBODIMENTS

Hereinafter, embodiments of the present disclosure will be described in detail with reference to the accompanying drawings. The above objects, features, and advantages of the present disclosure will be understood through the following embodiments with reference to the accompanying drawings. However, the present disclosure is not limited to the embodiments disclosed herein and can be modified in various forms. The embodiments of the present disclosure, which will be described below, are provided to clarify the technical spirit of the present disclosure and also to fully transfer the technical spirit thereof to those skilled in the art to which the present disclosure pertains. Therefore, the scope of the present disclosure should not be construed as being limited to embodiments which will be described below. In the following embodiments and the drawings, the same reference numerals denote the same components.

In addition, throughout this disclosure, terms such as a "first," "second," and the like are used not for limitative but for the purpose of distinguishing one component from another component. In addition, when a portion of a film, a region, a component, or the like is referred to as being "on" another portion, this includes not only a case in which the portion is "directly on" another portion but also a case in which another film, another region, another component, or the like is interposed between the portion and another portion.

FIG. 1 is a perspective diagram of a multi-display device according to an embodiment of the present disclosure. FIG. 2 is a diagram illustrating the rear surface of the multi-display device illustrated in FIG. 1, and more specifically, FIG. 2 is a diagram illustrating the rear surface of the multi-display device when viewing the multi-display device illustrated in FIG. 1 from a first viewing direction V1. All the components of the multi-display device according to all embodiments of the present disclosure are operatively coupled and configured.

Referring to FIGS. 1 and 2, a multi-display device 500 includes a first display 101, a second display 102, a third display 103, a fourth display 104, a frame part FR and a plurality of gap adjusting devices.

In the present embodiment, each of the first to fourth displays 101, 102, 103, 104 has a display plane for displaying an image, and the first to fourth displays 101, 102, 103, 104 can be arranged to have a tile form having the row direction of a first direction D1 and the column direction of a second direction D2.

Although the multi-display device 500 is composed of four displays in total in the present embodiment, the present disclosure is not limited to the number of displays constituting the multi-display device 500 or the arrangement method of the displays and can include any number of displays and/or display arrangements. For example, in another embodiment, the number of displays constituting the multi-display device 500 can be two, three, or five or more, and in still another embodiment, the plurality of displays of the multi-display device 500 can also be arranged in one row or one column or any matrix configuration (e.g., 3×5).

In the present embodiment, each of the first to fourth displays 101, 102, 103, 104 can be an organic light emitting display. However, the present disclosure is not limited to a type of each of the first to fourth displays 101, 102, 103, 104. For example, in another embodiment, each of the first to fourth displays 101, 102, 103, 104 can be a liquid crystal display or other types of displays.

The frame part FR is coupled to the rear surface of the first to fourth displays 101, 102, 103, 104, and the first to fourth displays 101, 102, 103, 104 can be coupled to each other by the frame part FR. In the present embodiment, the frame part FR can include a first frame F1 extending in the first direction D1 and a second frame F2 extending in the second direction D2.

In the present embodiment, the frame part FR is coupled to a mounting device fixed to the wall surface so that the first to fourth displays 101, 102, 103, 104 are mounted at the wall surface, or the frame part FR is coupled to another mounting device installed on the ground so that the first to fourth displays 101, 102, 103, 104 can be installed on the ground.

In the present embodiment, the first to fourth displays 101, 102, 103, 104 can be driven so that one image is displayed through the plurality of display planes of the first to fourth displays 101, 102, 103, 104, or can be selectively and independently driven so that different contents are displayed on one or more of the first to fourth displays 101, 102, 103, 104. Therefore, the multi-display device 500 can provide image information to many people in a public place through a large-sized display plane.

A plurality of gap adjusting devices 201, 202, 203, 204 are coupled to the rear surfaces of the first to fourth displays 101, 102, 103, 104. Each of the plurality of gap adjusting devices 201, 202, 203, 204 is coupled to two displays adjacent to each other among the first to fourth displays 101, 102, 103, 104 to adjust the gap between the two displays.

Meanwhile, in the multi-display device 500, the gap can be viewed as a portion where an image is not displayed. Therefore, in an embodiment of the present disclosure, the gap can be adjusted so that the gap is minimized by using the plurality of gap adjusting devices 201, 202, 203, 204, thereby improving the display quality of the multi-display device 500.

In the present embodiment, the plurality of gap adjusting devices 201, 202, 203, 204 include first gap adjusting devices 201, second gap adjusting devices 202, third gap adjusting devices 203, and fourth gap adjusting devices 204.

Each of the first gap adjusting devices 201 is coupled to the first and second displays 101, 102 and can be used for adjusting the gap in the first direction D1 between the first and second displays 101, 102. Each of the first gap adjusting devices 201 overlaps a first boundary BA1 of the first and second displays 101, 102, and the first gap adjusting devices 201 can be positioned to be spaced apart from each other along the first boundary BA1 in the second direction D2.

Each of the second gap adjusting devices 202 is coupled to the third and fourth displays 103, 104 and can be used for adjusting the gap in the first direction D1 between the third and fourth displays 103, 104. Each of the second gap adjusting devices 202 overlaps a second boundary BA2 of the third and fourth displays 103, 104, and the second gap adjusting devices 202 can be positioned to be spaced apart from each other along the second boundary BA2 in the second direction D2.

Each of the third gap adjusting devices 203 is coupled to the first and third displays 101, 103 and can be used for adjusting the gap in the second direction D2 between the first and third displays 101, 103. Each of the third gap adjusting devices 203 overlaps a third boundary BA3 of the first and third displays 101, 103, and the third gap adjusting devices 203 can be positioned to be spaced apart from each other along the third boundary BA3 in the first direction D1.

Each of the fourth gap adjusting devices 204 is coupled to the second and fourth displays 102, 104 and can be used for adjusting the gap in the second direction D2 between the second and fourth displays 102, 104. Each of the fourth gap adjusting devices 204 overlaps a fourth boundary BA4 of the second and fourth displays 102, 104, and the fourth gap adjusting devices 204 can be positioned to be spaced apart from each other along the fourth boundary BA4 in the second direction D2.

As described above, in the present embodiment, two gap adjusting devices are installed at each of the first to fourth boundaries BA1, BA2, BA3, BA4. However, the present disclosure is not limited to the number of gap adjusting devices installed at each of the first to fourth boundaries BA1, BA2, BA3, BA4, and the number of gap adjusting devices, which are installed according to the length of each of the first to fourth boundaries BA1, BA2, BA3, BA4, can be adjusted. For instance, any number of gap adjusting devices can be installed at a boundary between two displays, and if multiple gap adjusting devices are used, they can be spaced out at a uniform or non-uniform distance.

Although the positions where the plurality of gap adjusting devices 201, 202, 203, 204 are installed can be different from each other in the present embodiment, the plurality of gap adjusting devices 201, 202, 203, 204 have the same structure as each other. Therefore, a structure of one of the plurality of gap adjusting devices 201, 202, 203, 204 will be described below.

FIG. 3 is an exploded perspective diagram of the gap adjusting device 201 illustrated in FIG. 2, FIG. 4 is a plane diagram of the gap adjusting device 201 illustrated in FIG. 3, FIG. 5 is a rear diagram of the gap adjusting device 201 illustrated in FIG. 3, and FIG. 6 is a cross-sectional diagram illustrating the surface taken along the line I-I' illustrated in FIG. 4.

Referring to FIGS. 3, 4, 5, and 6, in the present embodiment, the gap adjusting device 201 includes a body BD, a first fixing part FX1, a second fixing part FX2, an adjusting part GR, a first wire W1, a second wire W2, a first spring SP1, and a second spring SP2.

In the present embodiment, the body BD includes an upper body B1 and a lower body B2, and the upper body B1 can be coupled to the lower body B2 by separate members such as bolts and nuts. Opening portions can be defined between the upper body B1 and the lower body B2, and the first and second fixing parts FX1, FX2 can be received in the opening portions.

In the present embodiment, a fastening hole BH, a first upper hole HL1, a second upper hole HL2, a first wire hole WH1, and a second wire hole WH2 are defined in the upper body B1.

In the present embodiment, the fastening hole BH is for coupling with the adjusting part GR, the fastening hole BH can be positioned at the center of the upper body B1, and the inner surface of the fastening hole BH can have a smooth shape. In another embodiment, screw grooves, which are coupled with threads formed at the outer surface of the adjusting part GR, can be formed at the inner surface of the fastening hole BH.

When viewing the body BD on the plane, the first wire hole WH1 and the second wire hole WH2 can be positioned to face each other with the fastening hole BH interposed therebetween. In the present embodiment, each of the first wire hole WH1 and the second wire hole WH2 can have a long-hole shape, and the longitudinal direction of each of the first wire hole WH1 and the second wire hole WH2 can be the first direction D1 in which the first fixing part FX1 and the second fixing part FX2 have been arranged.

The first wire hole WH1 can be positioned closer to the fastening hole BH than the first upper hole HL1, and the second wire hole WH2 can be positioned closer to the fastening hole BH than the second upper hole HL2. The first and second wire holes WH1, WH2 can be positioned to face each other with the fastening hole BH interposed therebetween.

The first wire hole WH1 and the second wire hole WH2 are formed in the upper body B1 so that the first wire W1 and the second wire W2 can be passed through, respectively. Therefore, one end of the first wire W1 is fixed to the first fixing part FX1, and the other end of the first wire W1 is drawn out to the outside of the body BD through the first wire hole WH1. Likewise, one end of the second wire W2 is fixed to the second fixing part FX2, and the other end of the second wire W2 is drawn out to the outside of the body BD through the second wire hole WH2.

A lower hole HL3 is defined in the lower body B2. The lower hole HL3 is defined in the lower body B2 in order to receive the coupling members (PN1, PN2 in FIG. 8A) fixed to the displays. In the present embodiment, the lower hole HL3 can have a long-hole shape, and the longitudinal direction of the lower hole HL3 can be the first direction D1.

The first fixing part FX1 and the second fixing part FX2 are received inside the body BD. The first fixing part FX1 and the second fixing part FX2 are coupled to have one-to-one correspondence to the displays different from each other, and each of the first fixing part FX1 and the second fixing part FX2 can transfer the tensile force to the corresponding display side among the displays in the direction toward the adjusting part GR.

A first bolt hole FH1 is defined in the first fixing part FX1, and a second bolt hole FH2 is defined in the second fixing part FX2. The first bolt hole FH1 and the second bolt hole FH2 can be exposed to the outside through each of the first upper hole HL1 and the second upper hole HL2. The first and second bolt holes FH1, FH2 are for fixing the first and second fixing parts FX1, FX2 to the displays, which will be described in more detail with reference to FIG. 8A.

In the present embodiment, the opening portion for receiving the first fixing part FX1 inside the body BD has a shape that has been communicated in the first direction D1 similar to the first upper hole HL1, and the opening portion for receiving the second fixing part FX2 inside the body BD has a shape that has been communicated in the first direction D1 similar to the second upper hole HL2. Therefore, the first fixing part FX1 and the second fixing part FX2 can be moved in the first direction D1 or the reverse direction of the first direction D1 in a state that has been received inside the body BD.

In the present embodiment, when viewing it on the plane, the size of the first fixing part FX1 is greater than the size of the first upper hole HL1. Therefore, when the first fixing part FX1 is moved in the first direction D1 inside the body BD, the first fixing part FX1 is prevented from being separated to the outside of the body BD through the first upper hole HL1. Like the first fixing part FX1, when viewing it on the plane, the size of the second fixing part FX2 is greater than the size of the second upper hole HL2.

The adjusting part GR is for adjusting the tensile force operating on the first and second fixing parts FX1, FX2, and the adjusting part GR is received in the fastening hole BH to be coupled to the upper body B1. In addition, the adjusting part GR is configured to be rotatable in a state that has been received in the fastening hole BH. Therefore, the size of the inner diameter of the fastening hole BH can be greater than the size of the outer diameter of the adjusting part GR.

In the present embodiment, the adjusting part GR can include a tightening part P1 and a head part P2. The tightening part P1 is received inside the fastening hole BH, and the first wire W1 and the second wire W2 are wound around the tightening part P1 by the rotation of the head part P2 or the first wire W1 and the second wire W2 wound around the tightening part P1 can be loosened. For example, when the head part P2 is rotated clockwise, the first wire W1 and the second wire W2 are wound around the tightening part P1 and the length of each of the first and second wires W1, W2 wound around the tightening part P1 can be increased. On the contrary, when the head part P2 is rotated counterclockwise, the first wire W1 and the second wire W2 are loosened from the tightening part P1, such that the length of each of the first and second wires W1, W2 wound around the tightening part P1 can be reduced.

The head part P2 is connected to the tightening part P1 and exposed to the outside. A fastening groove P3 can be formed in the head part P2. In the present embodiment, the fastening groove P3 can have a shape of a straight-line groove in order to receive the head of the tool, such as an external screw driver.

In the present embodiment, the end portion of each of the first wire W1 and the second wire W2 wound around the outer circumference of the tightening part P1 can be fixed to the head part P2. Therefore, in a state where the first wire W1 and the second wire W2 have been fixed to the head part P2, the first wire W1 and the second wire W2 can be wound around the tightening part P1 or loosened from the tightening part P1 according to the rotation direction of the head part P2.

In the present embodiment, the outer surface of the tightening part P1 can have a smooth shape. However, in another embodiment, threads can be formed at the outer surface of the tightening part P1, and in this case, screw grooves can be formed in the inner surface of the fastening hole BH corresponding to a shape of the tightening part P1.

The first wire W1 is connected to the adjusting part GR and the first fixing part FX1, and the second wire W2 is connected to the adjusting part GR and the second fixing part FX2. In the present embodiment, the first wire W1 and the second wire W2 can be formed of steel, one end of the first wire W1 can be bonded to the first fixing part FX1, and the other end of the first wire W1 can be bonded to the head part P2 of the adjusting part GR. In addition, one end of the second wire W2 can be bonded to the second fixing part FX2, and the other end of the second wire W2 can be bonded to the head part P2 of the adjusting part GR.

According to the structure of the first and second wires W1, W2 described above, as the adjusting part GR is rotated and the length of the first and second wires W1, W2 wound around the tightening part P1 is increased, the tensile force by which the first and second fixing parts FX1, FX2 are pulled by the first and second wires W1, W2 can be increased. Therefore, as the length in which the first and second wires W1, W2 are wound around the tightening part P1 of the adjusting part GR is lengthened, the spacing distance between each of the first fixing part FX1 and the second fixing part FX2 and the adjusting part GR can be reduced.

Hereinafter, the structures of the first spring SP1 and the second spring SP2 will be described further with reference to FIG. 7 as follows.

FIG. 7 is an enlarged diagram of the first spring SP1, the first wire W1, and the first fixing part FX1 illustrated in FIG. 3.

Further referring to FIG. 7, the first spring SP1 and the second spring SP2 are received inside the body BD. The first spring SP1 extends in the first direction D1 in a shape surrounding the circumference of the first wire W1 to be stretched or contracted between the first fixing part FX1 and the adjusting part GR. In addition, the second spring SP2 extends in the first direction D1 in a shape surrounding the circumference of the second wire W2 to be stretched or contracted between the second fixing part FX2 and the adjusting part GR.

In the present embodiment, the first and second springs SP1, SP2 provide the elastic force to the first and second fixing parts FX1, FX2. More specifically, according to the above-described configuration of the first and second springs SP1, SP2, when the adjusting part GR is rotated clockwise and the first and second wires W1, W2 are wound around the tightening part P1 of the adjusting part GR, the first and second springs SP1, SP2 can be contracted so that the length in the first direction D1 of each of the first and second springs SP1, SP2 is shortened. In addition, when the adjusting part GR is rotated counterclockwise and the first and second wires W1, W2 are loosened from the tightening part P1 of the adjusting part GR, the elastic force generated by the restoration of the contracted first and second springs SP1, SP2 can be operated on the first and second fixing parts FX1, FX2.

Therefore, the movement of the first and second wires W1, W2 can be smooth inside the body BD by the elastic force of the first and second springs SP1, SP2, and the first and second fixing parts FX1, FX2 can be moved to be away from each other by the elastic force of the first and second springs SP1, SP2. As a result, the first and second fixing parts FX1, FX2 can be restored to a position before the first and second springs SP1, SP2 are contracted.

Meanwhile, although the adjusting part GR can be prevented from being arbitrarily rotated by the force by which the first and second wires W1, W2 are wound around the adjusting part GR in the present embodiment, the gap adjusting device 500 can further include a rotation prevention member in order to compensate for preventing the arbitrary rotation of the adjusting part GR. In the present embodiment, the rotation prevention member can be coupled to the adjusting part GR in the detaching and attaching method, and the rotation prevention member can prevent the arbitrary rotation of the adjusting part GR by the method that is temporarily fitted into the body BD in a state that has been coupled to the adjusting part GR.

FIGS. 8A to 8C are diagrams illustrating a method for reducing the gap in the horizontal direction between the displays constituting the multi-display by using the gap adjusting device illustrated in FIG. 3. Meanwhile, FIGS. 8A to 8C are cross-sectional diagrams of the gap adjusting device, and in the description of FIGS. 8A to 8C, the above-described components are denoted by the reference numerals, and a redundant description of the components is omitted or will be brief.

First, referring to FIG. 2, the first display 101, the second display 102, the third display 103, and the fourth display 104 are installed to implement the multi-display device 500. In addition, each of the plurality of gap adjusting devices 201, 202, 203, 204 is coupled to the rear surfaces of two displays adjacent to each other among the first to fourth displays 101, 102, 103, 104 to adjust the gap between the two displays.

More specifically, each of the first gap adjusting devices 201 is coupled to the first and second displays 101, 102 to adjust the gap in the first direction D1 between the first and second displays 101, 102, and each of the second gap adjusting devices 202 is coupled to the third and fourth displays 103, 104 to adjust the gap in the first direction D1 between the third and fourth displays 103, 104. In addition, each of the third gap adjusting devices 203 is coupled to the first and third displays 101, 103 to adjust the gap in the second direction D2 between the first and third displays 101, 103, and each of the fourth gap adjusting devices 204 is coupled to the second and fourth displays 102, 104 to adjust the gap in the second direction D2 between the second and fourth displays 102, 104.

In the present embodiment, the method for adjusting the gap in the first direction D1 of two displays adjacent to each other in the first direction D1 by using any one of the plurality of gap adjusting devices 201, 202, 203, 204 can be substantially the same as the method for adjusting the gap in the second direction D2 of the two displays adjacent to each other in the second direction D2 by using another one of the plurality of gap adjusting devices 201, 202, 203, 204.

For example, if the horizontal direction including the first direction D1 and the second direction D2 is defined with respect to the first to fourth displays 101, 102, 103, 104, in the present embodiment, the methods for adjusting the gap in the horizontal direction of two displays adjacent to each other among the first to fourth displays 101, 102, 103, 104 by using the plurality of gap adjusting devices 201, 202, 203, 204 can be the same as each other. Therefore, hereinafter, the method for adjusting the gap in the first direction D1 between the first and second displays 101, 102 by using one gap adjusting device 201 among the first gap adjusting devices 201 will be described, and the method for adjusting the gap in the second direction D2 of the displays arranged adjacent to each other in the second direction D2 by using the third gap adjusting devices 203 or the fourth gap adjusting devices 204 is omitted.

Referring to FIGS. 2, 3, and 8A, the first coupling member PN1 is fixed to the rear surface of the first display 101, and the second coupling member PN2 is fixed to the rear surface of the second display 102. In the present embodiment, each of the first coupling member PN1 and the second coupling member PN2 can be a pem-nut, and in this case, the first coupling member PN1 and the second coupling member PN2 can be formed with grooves for receiving bolts, and screw grooves coupled to the threads of the bolt can be formed at the inner surface of the groove. In addition, the gap GP is formed in the first direction D1, which is the horizontal direction of the first and second displays 101, 102, between the first and second displays 101, 102, and the gap adjusting device 201 is provided to adjust the size of the gap GP.

Referring to FIGS. 2, 3, and 8B, the gap adjusting device 201 is fixed to the first and second displays 101, 102 by using the first fastening member BT1 and the second fastening member BT2. In the present embodiment, each of the first and second fastening members BT1, BT2 can be a bolt, and the first fastening member BT1 and the second fastening member BT2 can pass through the body BD and fastened to have one-to-one correspondence with the first and second coupling members PN1, PN2.

More specifically, the first fastening member BT1 is fastened to the first coupling member PN1 after sequentially passing through the first upper hole HL1, the first bolt hole FH1, and the lower hole HL3, and the second fastening member BT2 is fastened to the second coupling member PN2 after sequentially passing through the second upper hole HL2, the second bolt hole FH2, and the lower hole HL3. Therefore, the gap adjusting device 201 can be firmly fixed to the rear surface of each of the first display 101 and the second display 102 by the first and second fastening members BT1, BT2.

Meanwhile, as described above, when the gap adjusting device 201 is coupled to the first display 101 and the second display 102, the first and second coupling members PN1, PN2 can be received inside the lower hole HL3 of the lower body B2. Therefore, after the gap adjusting device 201 has been coupled to the first display 101 and the second display 102, the lower body B2 is in surface contact with the rear surfaces of the first and second displays 101, 102, thereby improving the effect that the gap adjusting device 201 supports the first and second displays 101, 102.

Referring to FIGS. 2, 3, and 8C, after the gap adjusting device 201 is fixed to the first and second displays 101, 102, the adjusting part GR is rotated so that the first and second wires W1, W2 are tightened.

In the present embodiment, when the adjusting part GR is rotated clockwise, the first wire W1 fixed to the first fixing part FX1 is wound around the adjusting part GR, and at the same time, the tensile force that is pulled toward the adjusting part GR side operates on the first fixing part FX1 by the first wire W1. As a result, as the length wound around the adjusting part GR of the total length of the first wire W1 is increased, the spacing distance between the first fixing part FX1 and the adjusting part GR is reduced. In addition, as the spacing distance between the first fixing part FX1 and the adjusting part GR is reduced, the degree that the first spring SP1 is contracted is increased and the length of the first spring SP1 is reduced.

Likewise, when the adjusting part GR is rotated clockwise, the second wire W2 fixed to the second fixing part FX2 is wound around the adjusting part GR, and at the same time, the tensile force that is pulled toward the adjusting part GR side operates on the second fixing part FX2 by the second wire W2. As a result, as the length wound around the adjusting part GR of the total length of the second wire W2 is increased, the spacing distance between the second fixing part FX2 and the adjusting part GR is reduced. In addition, as the spacing distance between the second fixing part FX2 and the adjusting part GR is reduced, the degree that the second spring SP2 is contracted is increased and the length of the second spring SP2 is reduced.

According to the above-described rotation of the adjusting part GR and the first and second wires W1, W2 and the first and second fixing parts FX1, FX2 that operate in interlock therewith, there occur the effects in that the first display 101 is pulled in the first direction D1, and the second display 102 is pulled in the reverse direction of the first direction D1. As a result, the size of the gap (GP in FIG. 8A) in the first direction D1 between the first and second displays 101, 102 can be reduced or substantially become zero.

Meanwhile, when the adjusting part GR is rotated counterclockwise, the first wire W1 wound around the adjusting part GR is loosened, and at the same time, the tensile force operating on the first fixing part FX1 through the first wire W1 is released. As a result, the elastic force generated as the first spring SP1 contracted between the first fixing part FX1 and the adjusting part GR is restored is transferred to the first fixing part FX1 side, such that the first fixing part FX1 is pushed away from the adjusting part GR so that the position of the first fixing part FX1 can be restored to the position illustrated in FIG. 8A.

Likewise, when the adjusting part GR is rotated counterclockwise, the second wire W2 wound around the adjusting part GR is loosened, and at the same time, the tensile force operating on the second fixing part FX2 through the second wire W2 is released. As a result, the elastic force generated as the second spring SP2 contracted between the second fixing part FX2 and the adjusting part GR is restored is transferred to the second fixing part FX2 side, such that the second fixing part FX2 is pushed away from the adjusting part GR so that the position of the second fixing part FX2 can be restored to the position illustrated in FIG. 8A.

FIGS. 9A to 9C are diagrams illustrating a method for adjusting the gap in the vertical direction between the displays constituting the multi-display by using the gap adjusting device illustrated in FIG. 3. Meanwhile, FIGS. 9A to 9C are side diagrams of the gap adjusting device, and in the description of FIGS. 9A to 9C, the above-described components are denoted by the reference numerals, and a redundant description of the components is omitted or will be brief.

Referring to FIG. 9A, the first coupling member PN1 is fixed to the rear surface of the first display 101, and the second coupling member PN2 is fixed to the rear surface of the second display 102. In addition, the gap GP is formed in the second direction D2, which is the vertical direction of the first and second displays 101, 102, between the first and second displays 101, 102, and the gap adjusting device 201 is provided to adjust the size of the gap GP. That is, in the present embodiment, the structure of the gap adjusting device 201 used to adjust the gap GP in the vertical direction of the first and second displays 101, 102 can be the same as the structure of the gap adjusting device (201 in FIG. 8A) for adjusting the gap (GP in FIG. 8A) in the horizontal direction described above with reference to FIGS. 8A to 8C.

Referring to FIG. 9B, the gap adjusting device 201 is fixed to the first and second displays 101, 102 by using the first fastening member BT1 and the second fastening member BT2. In the present embodiment, each of the first and second fastening members BT1, BT2 can be a bolt, and the first fastening member BT1 and the second fastening member BT2 can pass through the body BD and fastened to have one-to-one correspondence with the first and second coupling members PN1, PN2. Therefore, the gap adjusting device 201 can be firmly fixed to the rear surface of each of the first display 101 and the second display 102 by the first and second fastening members BT1, BT2.

Referring to FIG. 9C, after the gap adjusting device 201 is fixed to the first and second displays 101, 102, the adjusting part GR is rotated to tighten the first and second wires. As a result, similar to that described above with reference to FIG. 8C, the tensile force that is pulled toward the adjusting part GR side operates on the first and second fixing parts (FX1, FX2 in FIG. 8C) by the first and second wires (W1, W2 in FIG. 8C).

When the tensile force that pulls the first and second displays 101, 102 operates by the gap adjusting device 201, the gap adjusting device 201 can be in surface contact with the second display 102 in a state where the gap adjusting device 201 has been in surface contact with the first display 101. Therefore, according to the above-described operation of the gap adjusting device 201, the size of the gap GP in the third direction D3, which is the vertical direction between the first and second displays 101, 102, can be implemented to be reduced or to substantially become zero.

In addition, the structure of the gap adjusting device 201 necessary for adjusting the gap in the vertical direction between the first and second displays 101, 102 according to the present embodiment and the operating method thereof can be substantially the same as the structure of the gap adjusting device (201 in FIG. 8A) necessary for adjusting the gap in the horizontal direction between the first and second displays (101, 102 in FIG. 8C) described above with reference to FIG. 8C and the operating method thereof. Therefore, the gap in the vertical direction as well as the gap in the horizontal direction of the first and second displays 101, 102 can be adjusted by using the gap adjusting device 201 according to an embodiment of the present disclosure, thereby easily performing the installation work of the multi-display composed of the first and second displays 101, 102.

According to an embodiment of the present disclosure, it is possible to couple the gap adjusting device to the displays adjacent to each other, and to easily adjust the gap between the displays by rotating the adjusting part of the gap adjusting device. Therefore, it is possible to adjust the gap, which has been occurred in the procedure of arranging the plurality of displays in order to implement the multi-display device, by the gap adjusting device very easily, thereby improving the display quality of the multi-display device.

In addition, according to the gap adjusting device of an embodiment of the present disclosure, it is possible to adjust the gap in the vertical direction as well as the gap in the horizontal direction of the plurality of displays that implement the multi-display device at the same time. Therefore, it is possible to adjust the gap in the horizontal direction and the gap in the vertical direction collectively by one gap adjusting device when the gap adjusting device is mounted at the plurality of displays, thereby easily performing the installation work of the multi-display.

In addition, according to an embodiment of the present disclosure, the gap adjusting device is coupled to the rear surface of the displays and is used for adjusting the gap of the displays. Therefore, it is possible to omit the frames installed at the front surface and the side surface of the displays for preventing the occurrence of the gap of the displays. Therefore, it is possible to simplify the installation work of the multi-display.

Although the description has been made with reference to the embodiments of the present disclosure, it should be understood that various alternations and modifications of the present disclosure can be devised by those skilled in the art to which the present disclosure pertains without departing from the spirit and scope of the present disclosure, which are defined by the appended claims.

What is claimed is:

1. A gap adjusting device for adjusting a gap between displays of a multi-display, the gap adjusting device comprising:
    a body in which a fastening hole is defined;
    a first fixing part received inside the body, the first fixing part fixed to a first display;
    a second fixing part received inside the body, the second fixing part fixed to a second display adjacent to the first display;
    an adjusting part configured to be received in the fastening hole to be rotated, the adjusting part interposed between the first fixing part and the second fixing part;
    a first wire connected to the adjusting part and the first fixing part; and
    a second wire connected to the adjusting part and the second fixing part.

2. The gap adjusting device of claim 1,
wherein the adjusting part comprises:
    a tightening part received in the fastening hole, the tightening part winding a portion of each of the first wire and the second wire; and
    a head part connected to the tightening part and exposed to the outside.

3. The gap adjusting device of claim 2,
wherein the first wire and the second wire are wound around the tightening part as the head part rotates, so that a spacing distance between each of the first fixing part and the second fixing part and the adjusting part is reduced.

4. The gap adjusting device of claim 2,
wherein as the length wound around the tightening part of each of the first wire and the second wire is lengthened, a spacing distance between each of the first fixing part and the second fixing part and the adjusting part is reduced.

5. The gap adjusting device of claim 1, further comprising
a first spring received inside the body, the first spring having a shape extended to surround a circumference of the first wire to be stretched and contracted between the first fixing part and the adjusting part; and
a second spring received inside the body, the second spring having a shape extended to surround a circumference of the second wire to be stretched and contracted between the second fixing part and the adjusting part.

6. The gap adjusting device of claim 5,
wherein as the length wound around the adjusting part of each of the first wire and the second wire is lengthened, a length of each of the first spring and the second spring is reduced.

7. The gap adjusting device of claim 1,
wherein the body comprises:
an upper body; and
a lower body coupled with the upper body,
wherein a fastening hole, a first wire hole through which the first wire passes, and a second wire hole through which the second wire passes are defined in the outside of the upper body.

8. The gap adjusting device of claim 7, further comprising:
a first fastening member for passing through a first upper hole defined in the upper body and fixing the first fixing part to the first display; and
a second fastening member for passing through a second upper hole defined in the upper body and fixing the second fixing part to the second display.

9. The gap adjusting device of claim 8,
wherein the first fastening member is coupled to a first coupling member fixed to the first display, and the second fastening member is coupled to a second coupling member fixed to the second display, and
wherein a lower hole for receiving the first coupling member and the second coupling member is defined in the lower body.

10. The gap adjusting device of claim 9,
wherein when viewing the body on a plane, each of the first upper hole, the second upper hole, and the lower hole has a shape of a long-hole in a direction in which the first fixing part and the second fixing part have been arranged.

11. A multi-display, comprising:
a first display;
a second display positioned adjacent to the first display; and
a gap adjusting device coupled with the first display and the second display, and configured to adjust a gap between the first display and the second display,
wherein the gap adjusting device comprises:
a body in which a fastening hole is defined;
a first fixing part received inside the body, the first fixing part fixed to the first display;
a second fixing part received inside the body, the second fixing part fixed to the second display;
an adjusting part configured to be received in the fastening hole to be rotated, the adjusting part interposed between the first fixing part and the second fixing part;
a first wire connected to the adjusting part and the first fixing part; and
a second wire connected to the adjusting part and the second fixing part.

12. The multi-display of claim 11, further comprising a third display positioned adjacent to the first display,
wherein the first display and the second display are arranged in a first direction, and the first display and the third display are arranged in a second direction intersecting with the first direction, and
wherein the gap adjusting device is provided in plural, at least one of the plurality of gap adjusting devices is coupled to the first and second displays to adjust the gap in the first direction of the first and second displays, and at least another one of the plurality of gap adjusting devices is coupled to the first and third displays to adjust the gap in the second direction of the first and third displays.

13. The multi-display of claim 11,
wherein the adjusting part comprises:
a tightening part received in the fastening hole, the tightening part winding a portion of each of the first wire and the second wire; and
a head part connected to the tightening part and exposed to the outside.

14. The multi-display of claim 11,
wherein the gap adjusting device further comprises:
a first spring received inside the body, the first spring having a shape extended to surround a circumference of the first wire to be stretched and contracted between the first fixing part and the adjusting part; and
a second spring received inside the body, the second spring having a shape extended to surround a circumference of the second wire to be stretched and contracted between the second fixing part and the adjusting part.

15. The multi-display of claim 11,
wherein the body comprises:
an upper body; and
a lower body coupled with the upper body,
wherein the fastening hole, a first wire hole through which the first wire passes, and a second wire hole through which the second wire passes are defined in the outside of the upper body.

16. The multi-display of claim 15, further comprising:
a first coupling member fixed to a rear surface of the first display;
a second coupling member fixed to a rear surface of the second display;
a first fastening member for passing through a first upper hole defined in the outside of the upper body and fixing the first fixing part to the first coupling member; and
a second fastening member for passing through a second upper hole defined in the outside of the upper body and fixing the second fixing part to the second coupling member.

17. The multi-display of claim 16,
wherein a lower hole for receiving the first coupling member and the second coupling member is defined in the lower body, and when viewing the body on a plane, each of the first upper hole, the second upper hole, and the lower hole has a shape of a long-hole in a direction in which the first fixing part and the second fixing part have been arranged.

\* \* \* \* \*